(12) United States Patent
Keay et al.

(10) Patent No.: US 12,528,634 B2
(45) Date of Patent: Jan. 20, 2026

(54) PROTECTIVE TRANSPORT CASE FOR VIDEO MONITORS

(71) Applicant: The Skydyne Company, Port Jervis, NY (US)

(72) Inventors: Peter Keay, Shohola, PA (US); Richard Dansen, Jr., Milford, PA (US)

(73) Assignee: THE SKYDYNE COMPANY, Port Jervis, NJ (US)

( * ) Notice: Subject to any disclaimer, the term of this patent is extended or adjusted under 35 U.S.C. 154(b) by 196 days.

(21) Appl. No.: 18/141,211

(22) Filed: Apr. 28, 2023

(65) Prior Publication Data

US 2023/0348165 A1  Nov. 2, 2023

Related U.S. Application Data

(60) Provisional application No. 63/335,959, filed on Apr. 28, 2022.

(51) Int. Cl.
*B65D 81/107* (2006.01)
*A45C 5/14* (2006.01)
*B65D 81/02* (2006.01)

(52) U.S. Cl.
CPC ............... *B65D 81/02* (2013.01); *A45C 5/14* (2013.01)

(58) Field of Classification Search
CPC .......... H04N 5/64; H04N 5/655; B65D 85/48; B65D 2585/6837; A45C 2013/025; A45C 11/003
USPC ....................................................... 206/454
See application file for complete search history.

(56) References Cited

U.S. PATENT DOCUMENTS

| 8,885,110 B1* | 11/2014 | St. Clair | H04N 5/65 348/836 |
| 11,129,288 B2* | 9/2021 | Baek | B65D 65/14 |
| 11,320,087 B2* | 5/2022 | Wojciechowski | F16M 11/10 |
| 2007/0215501 A1* | 9/2007 | Hanson | B65D 85/30 206/583 |
| 2011/0010313 A1* | 1/2011 | Ozias | G06Q 99/00 713/1 |
| 2013/0279090 A1* | 10/2013 | Brandt | F16M 11/18 361/679.01 |
| 2014/0157730 A1* | 6/2014 | Lee | B65D 81/113 53/473 |
| 2014/0190867 A1* | 7/2014 | Shi | B65D 81/113 206/701 |

FOREIGN PATENT DOCUMENTS

CN 113830436 A * 12/2021

* cited by examiner

*Primary Examiner* — Allan D Stevens
(74) *Attorney, Agent, or Firm* — Panitch Schwarze Belisario & Nadel LLP

(57) ABSTRACT

A transport case for a video monitor includes a lower case body with an upper opening. A lower frame is disposed and secured within the lower case body and has a lower-frame base plate. A damper is disposed between the lower case body and the lower frame. A pressure plate is located on the lower-frame base plate in facing engagement therewith and is configured to make contact with the screen area of the video monitor when the video monitor is positioned in the transport case. An upper frame is configured to securely attach to the lower frame and configured to extend transversely at least partially across the lower frame to hold the video monitor screen area in facing engagement with the pressure plate.

25 Claims, 13 Drawing Sheets

PROTECTIVE TRANSPORT CASE FOR VIDEO MONITORS

CROSS-REFERENCE TO RELATED APPLICATIONS

This application claims the benefit of priority under 35 USC § 119(e) of U.S. Provisional Patent Application No. 63/335,959 filed Apr. 28, 2023; and the contents of the application identified in this paragraph are incorporated into the present application by reference in their entirety.

BACKGROUND OF THE DISCLOSURE

The present disclosure relates generally to a transport case for protecting and transporting video monitors, and more particularly relates to a transport case configured to provide protection enabling the transport of a large video monitor in a generally horizontal position, with the screen generally parallel to the ground, as opposed to an upright position. The present disclosure relates more particularly to a transport case comprising lower frame for securing a video monitor, the lower frame being configured to isolate the video monitor from impacts upon the transport case or mechanical forces, including shocks and compressive forces, imposed upon to the transport case.

Large video monitors, with screens exceeding about 45 inches (about 114.3 cm) are difficult to transport because the video monitors have large glass screens that are susceptible to damage. When a video monitor with a large screen are stored or transported in a conventional container in a generally horizonal position, forces oriented vertically—for example, the force of gravity, as well as vertical forces or shocks imposed by vibrations, dropping, or stacking of containers—are applied transversely to the screen surface. As a result, the forces on the video monitor are prone to cause the screen to flex and crack.

To reduce the incidence of cracking, large video monitors are commonly stored and transported in containers marked for storage and movement with the screen in a vertical orientation, so that vertically oriented forces are parallel to the screen surface. While transporting a video monitor with the screen oriented vertically can reduce the incidence of cracking due to vertically oriented forces, this solution suffers from certain shortcomings. First, a container adapted to carry a modern, thin video monitor has a relatively small depth compared to the length and width thereof. As a result, when the container is carried with the screen oriented vertically, the container is less stable and more difficult to handle than a container for transporting a like-sided video monitor while oriented horizontally. Second, if the container should fall from an upright position on a ground surface to a horizontal position, impact with the surface will impose a shock oriented transversely with respect to the screen. Such a shock is likely to crack the screen of the video monitor.

As will be discussed in detail below, disclosed herein are embodiments of a transport case that protects a large video monitor for transporting in a stable horizontal orientation, without imposing the greater risk of damage that otherwise would be encountered in transporting the large video monitor in a horizontal orientation otherwise.

BRIEF SUMMARY OF THE DISCLOSURE

Briefly stated, one aspect of the present disclosure is directed a transport case for a video monitor having a monitor screen with a screen area and a back portion. The transport case for a video monitor includes a first outer panel having a first outer surface and a first inner surface. A side wall is fixed to the first inner surface and extends transversely therefrom. The side wall forms a case perimeter wall. The first outer panel and the side wall together form a lower case body with an upper opening. A lower frame is disposed and secured within the lower case body and has a lower-frame base plate. A damper is disposed between the lower case body and the lower frame. A second outer panel has a second outer surface and a second inner surface. The second outer panel is configured to attach to the lower case body and thereby cover the upper opening of the lower case body. A pressure plate is located on the lower-frame base plate in facing engagement therewith and is configured to make contact with the screen area of the video monitor when the video monitor is positioned in the transport case. An upper frame is configured to securely attach to the lower frame and configured to extend transversely at least partially across the lower frame to hold the video monitor screen area in facing engagement with the pressure plate.

In some embodiments, the lower frame has a lower frame perimeter wall including a first side wall, a second side wall, and a third side wall.

In some embodiments, the damper is disposed between the lower case body and each side of the lower frame.

In some embodiments, the upper frame is configured to extend from the first side to a second side of the lower frame and securely attach to the second side of the lower frame.

In some embodiments, the transport case includes a monitor mount including a mounting frame configured to be secured to the back portion of the video monitor and to the upper frame.

In some embodiments, a transport case includes a means for securing the upper frame to the lower frame. The means for securing may be configured to urge the upper frame toward the lower frame, thereby urging the video monitor in a direction toward the pressure plate so that the screen area bears against the pressure plate.

In some embodiments, the transport case includes a clamp configured to secure the upper frame to the lower frame and to urge the upper frame toward the lower frame, thereby urging the video monitor in a direction toward the pressure plate so that the screen area bears against the pressure plate.

In some embodiments, the upper frame is pivotably attached to the lower frame.

In some embodiments, the upper frame is configured to engage and support the video monitor in an upright position upon the video monitor being lowered onto a portion of the upper frame.

In some embodiments, the upper frame is configured to engage the mounting frame when the mounting frame is in a working position attached to the video monitor and thereby support the video monitor in an upright position, whereby the video monitor and the mounting frame can be lowered together onto a portion of the upper frame.

In some embodiments, the mounting frame includes: a first frame portion having a plurality of fastener apertures extending therethrough for fastening the mounting frame to the video monitor; a second frame portion connected to the first frame portion and providing a first mounting-frame-upper-frame connecting body; and a mounting stud extending from the mounting frame. In some embodiments, the upper frame includes: a base member pivotably attached to the lower frame; and a second mounting-frame-upper-frame-connecting body connected to the base member configured to engage with the first mounting-frame-upper-frame connecting body. In some embodiments, a mounting aperture is configured to align with the mounting stud when the first mounting-frame-upper-frame-connecting body is engaged with the first mounting-frame-upper-frame connecting body.

In some embodiments, the upper frame includes a support element, the support element extending horizontally when the upper frame is in an upright position. The support element is configured to engage the mounting frame to provide vertical support to the video monitor.

In some embodiments, the mounting frame includes: an upper horizontal frame leg, a lower horizontal frame leg, a left vertical frame leg, and a right vertical frame leg. The left vertical frame leg is attached to the upper horizonal frame leg and the lower horizontal frame leg, and the right vertical frame leg is attached to the upper horizontal frame leg and the lower horizontal frame leg. A connecting plate extends between the left vertical frame leg and the right vertical frame leg, the connecting plate having a mounting aperture and a ledge projecting horizontally and rearwardly. The ledge is positioned between the left vertical frame leg and the right vertical frame leg. The ledge includes a tab aperture. A plurality of fastener apertures extends through the mounting frame for fastening the mounting frame to the video monitor. A mounting stud extends from the mounting frame. The upper frame includes: a base pivotably attached to the lower frame; a principal member extending from the base and extendable across the lower frame from the first side to proximate the second side thereof; and a support plate. The support plate has a mounting tab projecting vertically therefrom and adapted to be received in the tab aperture of the connecting plate of the mounting frame, and a mounting aperture is configured to align with the mounting stud when the mounting tab is received in the tab aperture of the connecting plate.

In some embodiments, at least two of the first side wall, the second side wall, and the third side wall are slidably mounted with respect to the lower-frame base plate.

In some embodiments, the transport case includes a rollable platform configured to be removably securable to the transport case. The rollable platform includes a platform base with an upper platform surface and a lower platform surface; a first caster, the first caster being non-swiveling and extending below the lower platform surface, and a second caster, the second caster being non-swiveling and oriented parallel to the first caster. The second caster extends below the lower platform surface; a first attachment fixture located on an exterior of the transport case, the first attachment fixture being configured for removably securing the rollable platform to the transport case with the first caster and the second caster aligned parallel with respect to at least one of the first outer panel or the second outer panel; and a second attachment fixture located on the exterior of the transport case, the second attachment fixture being configured for removably securing the rollable platform to the transport case with the first caster; and the second caster is aligned perpendicularly with respect to at least one of the first outer panel or the second outer panel.

In some embodiments, the transport case further includes: a handle body including a handlebar and a handle base fixed to the handlebar. The handle base is selectably securable to the exterior of the transport case with the handlebar oriented perpendicularly with respect to at least one of the first outer panel or the second outer panel, and is selectably securable with the handlebar oriented parallel with respect to at least one of the first outer panel or the second outer panel.

In some embodiments, the exterior of the transport case defines a rectangular body having a top main surface, a bottom main surface, a first end surface, a second end surface, a first side surface, and a second side surface. The first attachment fixture and the second attachment fixture are both located on the first end surface.

In some embodiments, the support plate is slidably mounted to the principal member and releasably securable to the principal member.

In some embodiments, the transport case further includes a rollable platform configured to be removably securable to the transport case. The rollable platform includes: a platform base with an upper platform surface and a lower platform surface; a first wheel of fixed orientation extending below the lower platform surface; and a second wheel of fixed orientation parallel to the first wheel. The second wheel extends below the lower platform surface. A first attachment fixture is located on an exterior of the transport case, the first attachment fixture being configured for removably securing the rollable platform to the transport case with the first wheel and the second wheel aligned parallel with respect to at least one of the first outer panel or the second outer panel. A second attachment fixture is located on the exterior of the transport case, the second attachment fixture being configured for removably securing the rollable platform to the transport case with the first wheel and the second wheel aligned perpendicularly with respect to at least one of the first outer panel or the second outer panel.

In some embodiments, the transport case further includes a handle body including a handlebar and a handle base fixed to the handlebar. The handle base is selectably securable to the exterior of the transport case with the handlebar oriented perpendicularly with respect to at least one of the first outer panel or the second outer panel and is selectably securable with the handlebar oriented parallel with respect to at least one of the first outer panel or the second outer panel.

In some embodiments, the transport case further includes: a handle body including a handlebar and a handle base fixed to the handlebar; and a third attachment fixture located on the exterior of the transport case, the third attachment fixture being configured for removably securing the handle base to the exterior of the transport case with the handlebar oriented perpendicularly with respect to at least one of the first outer panel or the second outer panel. A fourth attachment fixture is located on the exterior of the transport case, the fourth attachment fixture being configured for removably securing the handle base to the exterior of the transport case with the handlebar oriented parallel with respect to at least one of the first outer panel or the second outer panel.

In some embodiments, the exterior of the transport case defines a rectangular body having a top main surface, a bottom main surface, a first end surface, a second end surface, a first side surface, and a second side surface; and the first attachment fixture and the second attachment fixture are both located on the first end surface.

In some embodiments, the exterior of the transport case defines a rectangular body having a top main surface, a bottom main surface, a first end surface, a second end surface, a first side surface, and a second side surface; and the third attachment fixture and the fourth attachment fixture are both located on the second end surface.

BRIEF DESCRIPTION OF THE DRAWINGS

The following detailed description will be better understood when read in conjunction with the appended drawings. For the purpose of illustrating the invention, there are shown in the drawings various embodiments, including embodiments which may be presently preferred. It should be understood, however, that the invention is not limited to the precise arrangements and instrumentalities shown. In the drawings.

DETAILED DESCRIPTION OF THE INVENTION

Figure 1:
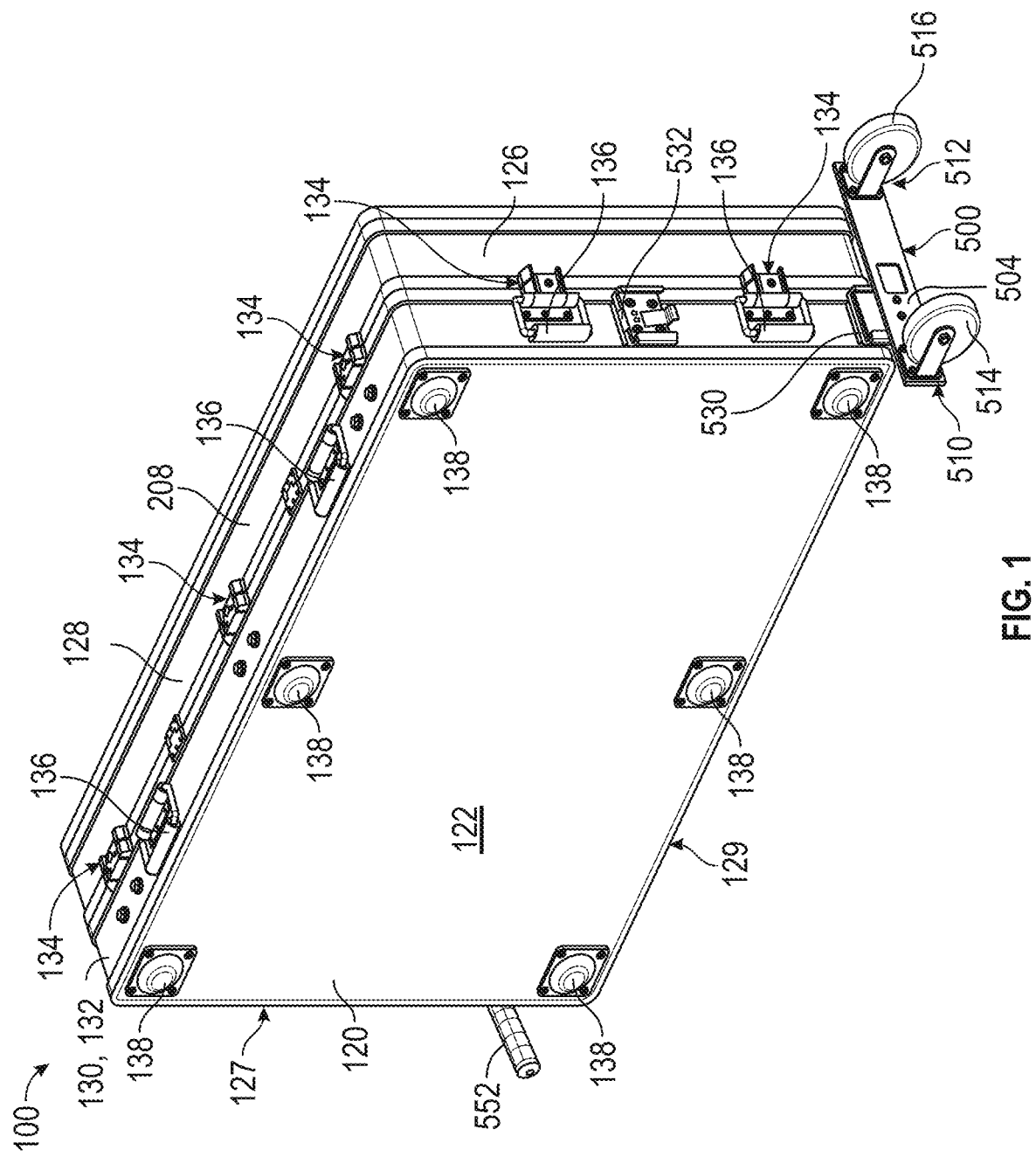
FIG. 1 is a front perspective partially schematic view of a transport case according to a first preferred embodiment of the present disclosure.

Certain terminology is used in the following description for convenience only and is not limiting. The words "right," "left," "lower," and "upper" designate directions in the drawings to which reference is made. The words "inner" and "outer" refer to directions toward and away from, respectively, the geometric center of an element and designated parts thereof. Unless specifically set forth herein, the terms "a," "an," and "the" are not limited to one element but instead should be read as meaning "at least one." "At least one" may occasionally be used for clarity or readability, but such use does not change the interpretation of "a," "an," and "the." Moreover, the singular includes the plural, and vice versa, unless the context clearly indicates otherwise. As used herein, the terms "proximal" and "distal" are relative terms referring to locations or elements that are closer to (proximal) or farther from (distal) with respect to other elements, the user, or designated locations. "Including" as used herein means "including but not limited to." The word "or" is inclusive, so that "A or B" encompasses A and B together, A only, and B only. The terms "about," "approximately," "generally," "substantially," and like terms used herein, when referring to a dimension or characteristic of a component, indicate that the described dimension/characteristic is not a strict boundary or parameter and does not exclude minor variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit thereof. For the purposes of this application, a first element is oriented parallel to a second element if the two elements are either aligned or are distinct and parallel. The fact that Applicant may occasionally recite "parallel or coincident to" with respect to a pair of axes does not change this usage: "parallel to" means "parallel to or coincident with." Throughout this application, "rectangular" and "perpendicular" are used in a descriptive rather than geometric sense. For example, elements may be described as "rectangular" despite having rounded corners or other deviations from a geometrically perfect rectangle. Moreover, elements described as "substantially perpendicular" may be precisely perpendicular or may meet at angles somewhat less than 90 degrees, such as 89 degrees, 85 degrees, or 80 degrees. The terminology defined in this paragraph includes the above-listed words, derivatives thereof and words of similar import.

In one aspect, FIGS. 1-15 are partially schematic views of a first embodiment of a transport case 100 and/or a video monitor 110 transported in the transport case 100 in accord with the present invention. The transport case 100 is configured for the video monitor 110, which has a back portion 112 and an opposite front side with a screen panel 115 with a screen area 116 (which is an outwardly facing surface of the screen of the video monitor 110), with the screen panel 115 preferably being a glass panel surrounded by a bezel 118. The video monitor may have a relatively low-depth body, with the body and the screen area 116 having length-to-width ratio of roughly 16:9 or 2:1, all as is common with currently available video monitors. The transport case 100 preferably comes is different sizes corresponding to different sizes of video monitors. The transport case 100 is generally intended for use for video monitors with screen sized in the range of about 50 inches (127 cm) to about 85 inches (215.9 cm), but the present invention is not so limited.

The transport case 100 includes a first outer panel 120 having a first outer surface 122 and a first inner surface 124. The first outer surface may include feet 138. A side wall 130 is fixed to the first inner surface 124 and extends transversely therefrom. The side wall 130 forms a case perimeter wall 132 forming part of the exterior of transport case 100. The first outer panel 120 and the side wall 130 together form a lower case body 140 (FIGS. 3-6) with an upper opening 142, an inner surface 144 including inner surfaces of the side wall 130 and the case perimeter wall 132, and an outer surface 146. The first outer panel 120 and the side wall 130 together form the lower case body 140, which protects and contains the video monitor 110. The first outer panel 120 and the side wall 130, and thus the lower case body 140, are preferably formed a strong, stiff, tough, and relatively lightweight material—suitable example include metals, a composite formed from two aluminum sheets with a thin piece of balsa wood, plywood, or other suitable material placed between the aluminum sheets, or others suitable materials known or that may become known in the art. The first outer panel 120 and the side wall 130 are constructed to provide the transport case 100 mechanical properties to provide a desired degree of resistance to shock loads (dropping or other impacts), compressive loads (from stacking of items upon the transport case), and vibrations, and to allow the use of fasteners to secure components of the transport case to the first outer panel 120 and the side wall 130.

A second outer panel 200, a second outer surface 202, a second inner surface 204, and a perimeter wall 206 form an upper case body 208, which is attachable to the lower case body 140 to close the upper opening 142 thereof. The lower case body 140 and the upper case body 208 carry engageable components of clamps 134 (FIG. 1) or other conventional closure mechanisms that are engageable to secure the transport case 100, enclosing and protecting the video monitor 110 on all sides. The lower case body 140 also includes foldable handles 136 (FIG. 1), which may be placed on any convenient portion of the transport case 100, including on the upper case body 208 of the transport case 100. The second outer panel 200 and upper case body 208 may be made from the same types of materials identified above with respect to the first outer panel 120, as discussed above.

Figure 4:
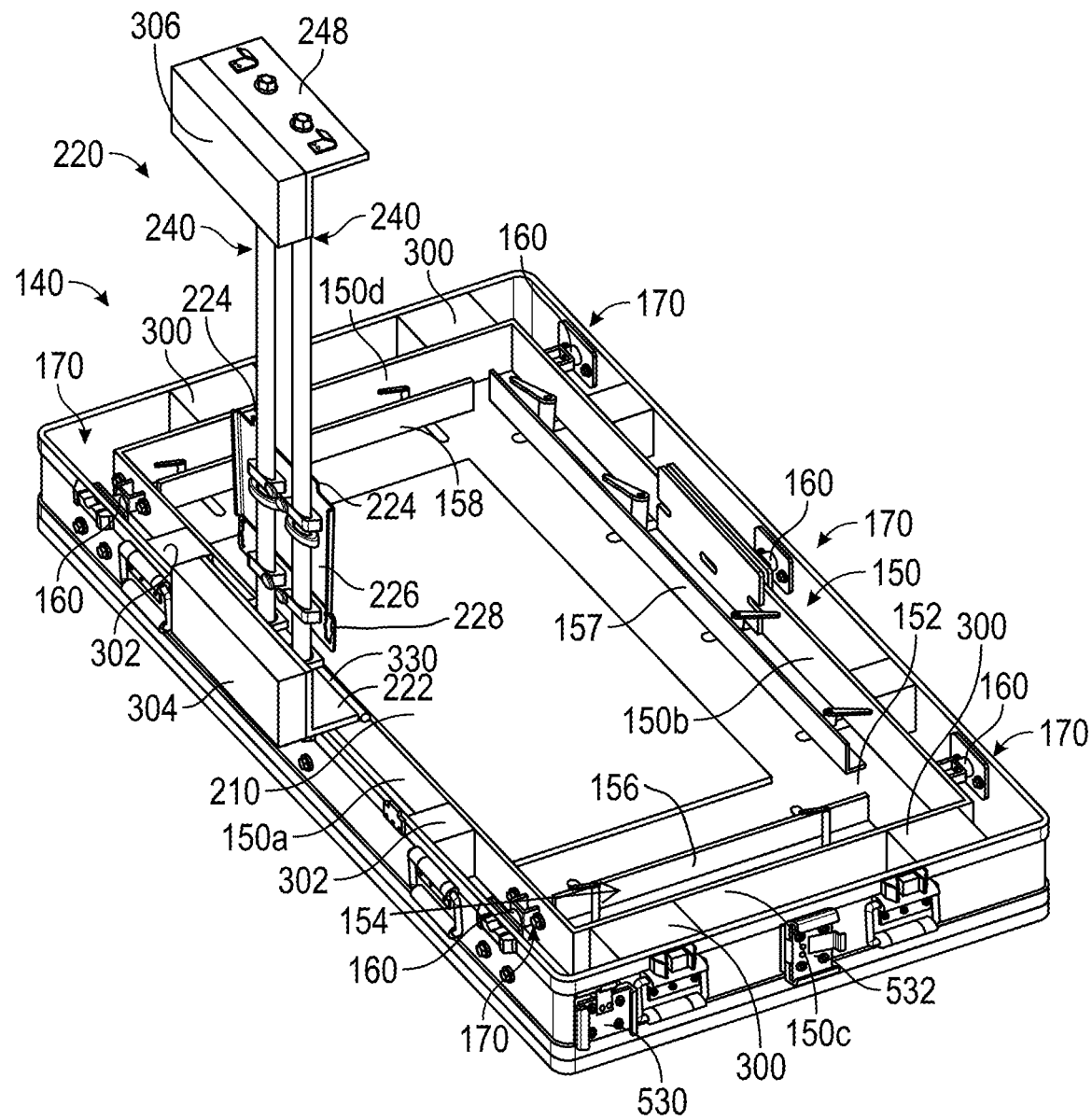
FIG. 4 is a side perspective partially schematic view of the lower case body of the transport case of FIG. 1, with a lower frame and a lower frame disposed therein, and an upper frame in an upright position and connected to the lower frame.
Figure 5:
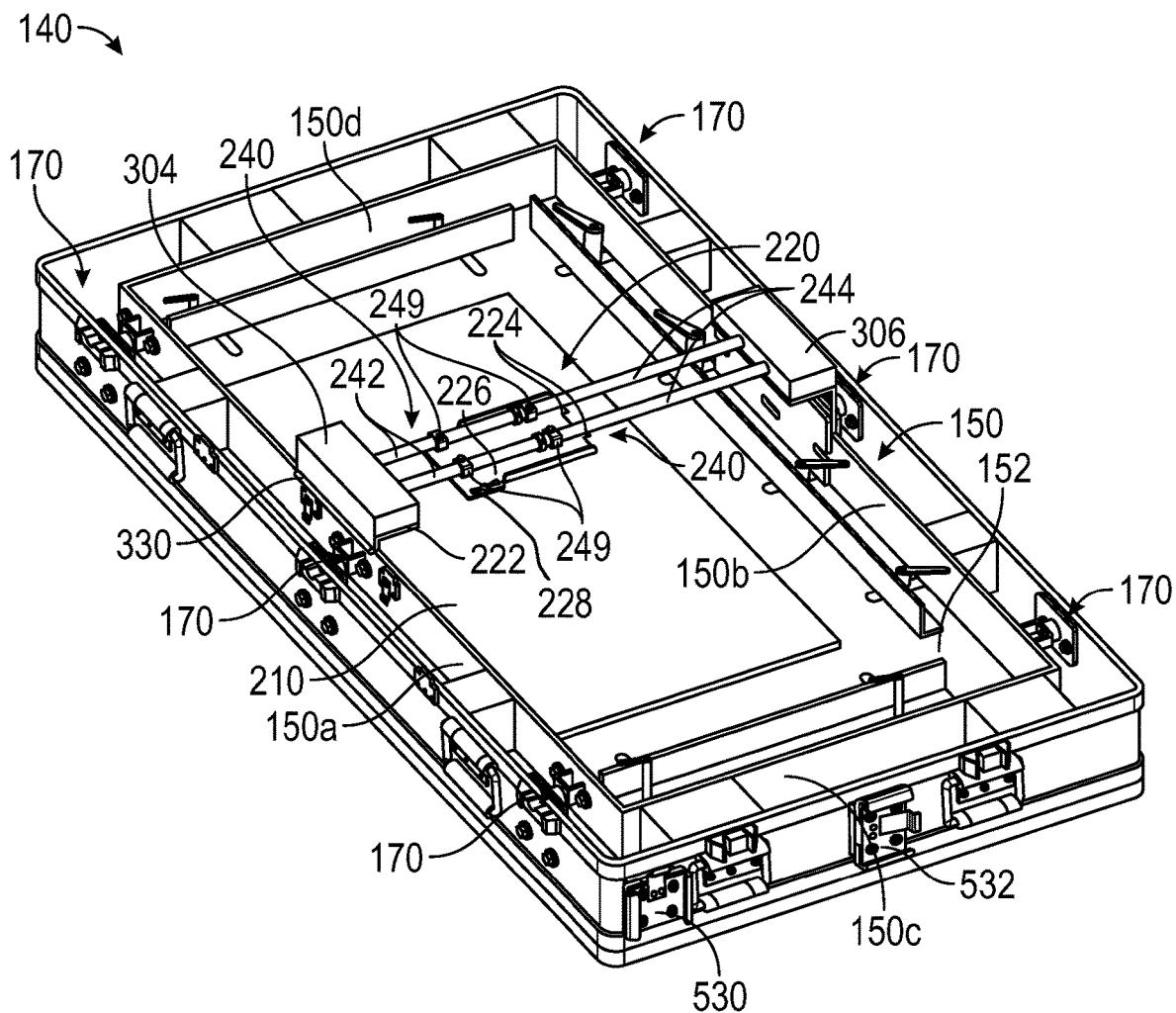
FIG. 5 is a side perspective partially schematic view of the lower case body of the transport case as in FIG. 4, with the upper frame in lowered position and connected to the lower frame.

Referring to FIGS. 4 and 5, a lower frame 150 is disposed and secured within the lower case body 140 and has a lower-frame base plate 152. The lower frame 150 as shown is rectangular with a length-to-width ratio of roughly 16:9 or 2:1, consistent with the corresponding length-to-width ratios commonly found in video monitors, with rounded corners, but the present invention is applicable to other shapes of video monitors as well. In illustrated embodiment, the lower frame 150 has a first side 150a and a second side 150b parallel thereto and forming the longer sides of the lower frame 150. The first side 150a and the second side 150b are straight and parallel in the embodiment shown but in other embodiments may not be perfectly so. The lower frame 150 also has a third side 150c and a fourth side 150d forming the shorter sides of the rectangular shape; the third side 150c and the fourth side 150d are straight and parallel in the embodiment shown but in need not be perfectly so.

Figure 3:
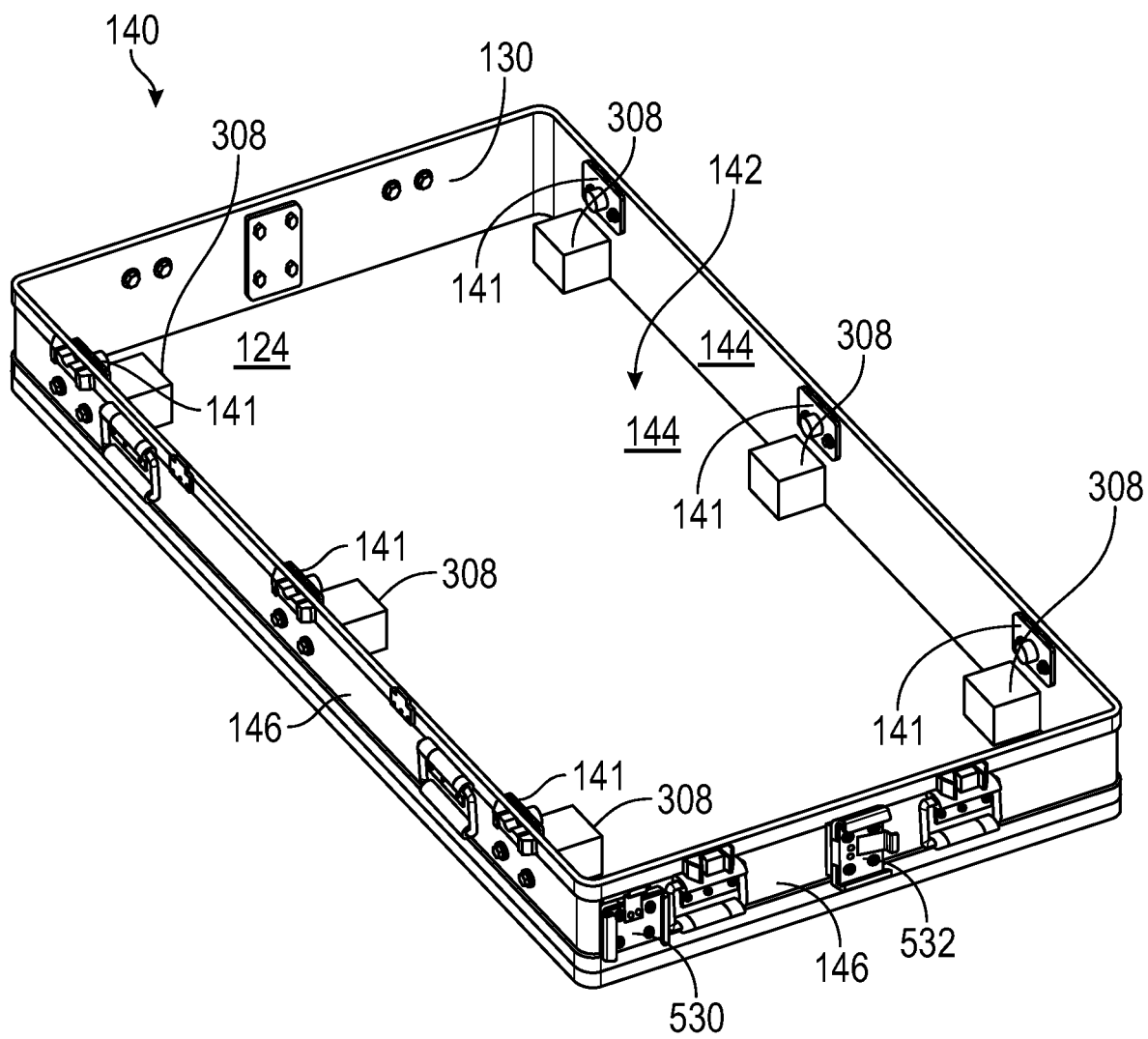
FIG. 3 is a side perspective partially schematic view of a lower case body of the transport case of FIG. 1.
Figure 6:
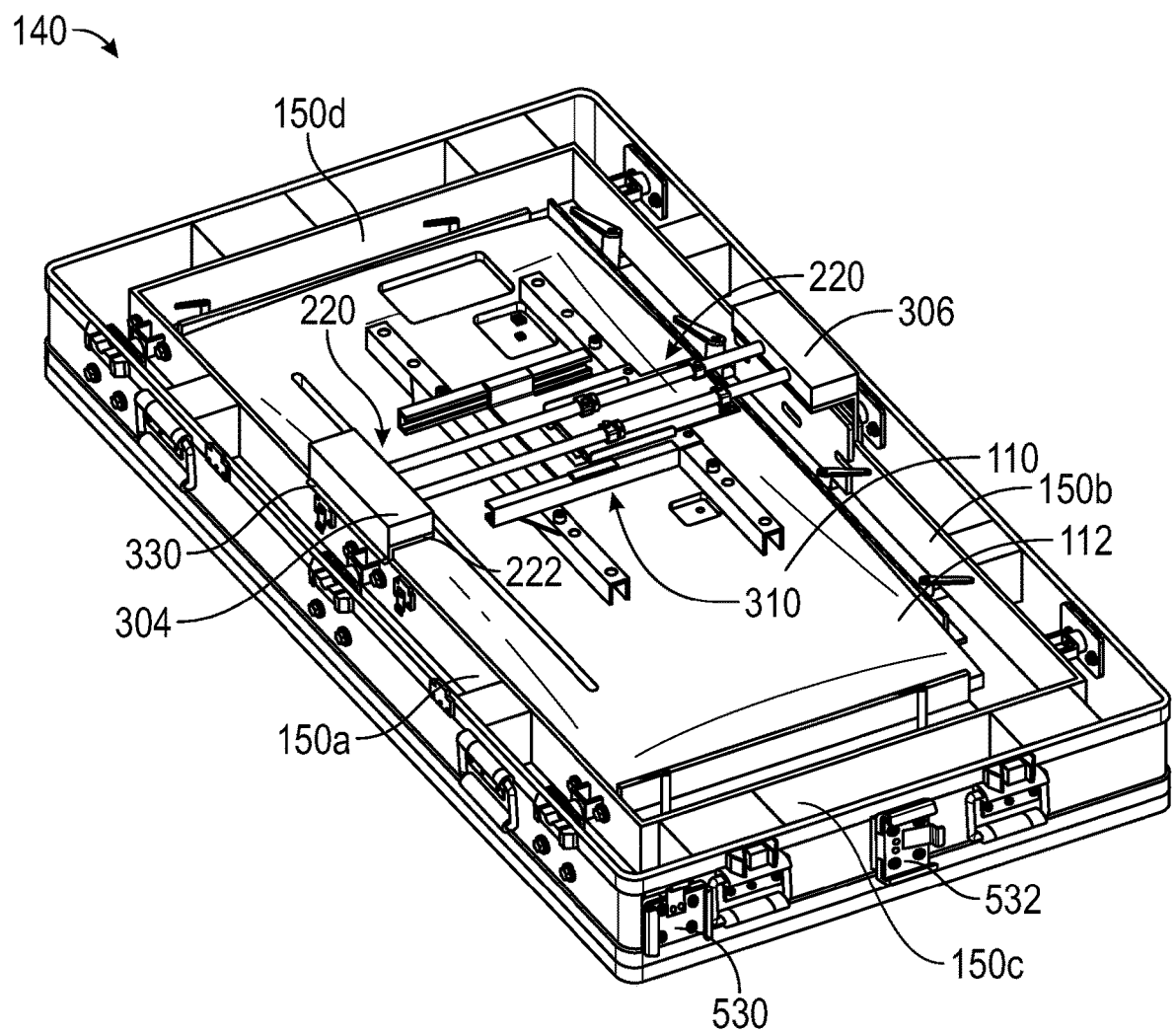
FIG. 6 is a side perspective partially schematic view of the lower case body of the transport case as in FIG. 4, with a video monitor and a monitor mount in a working position with respect thereto.
Figure 7:
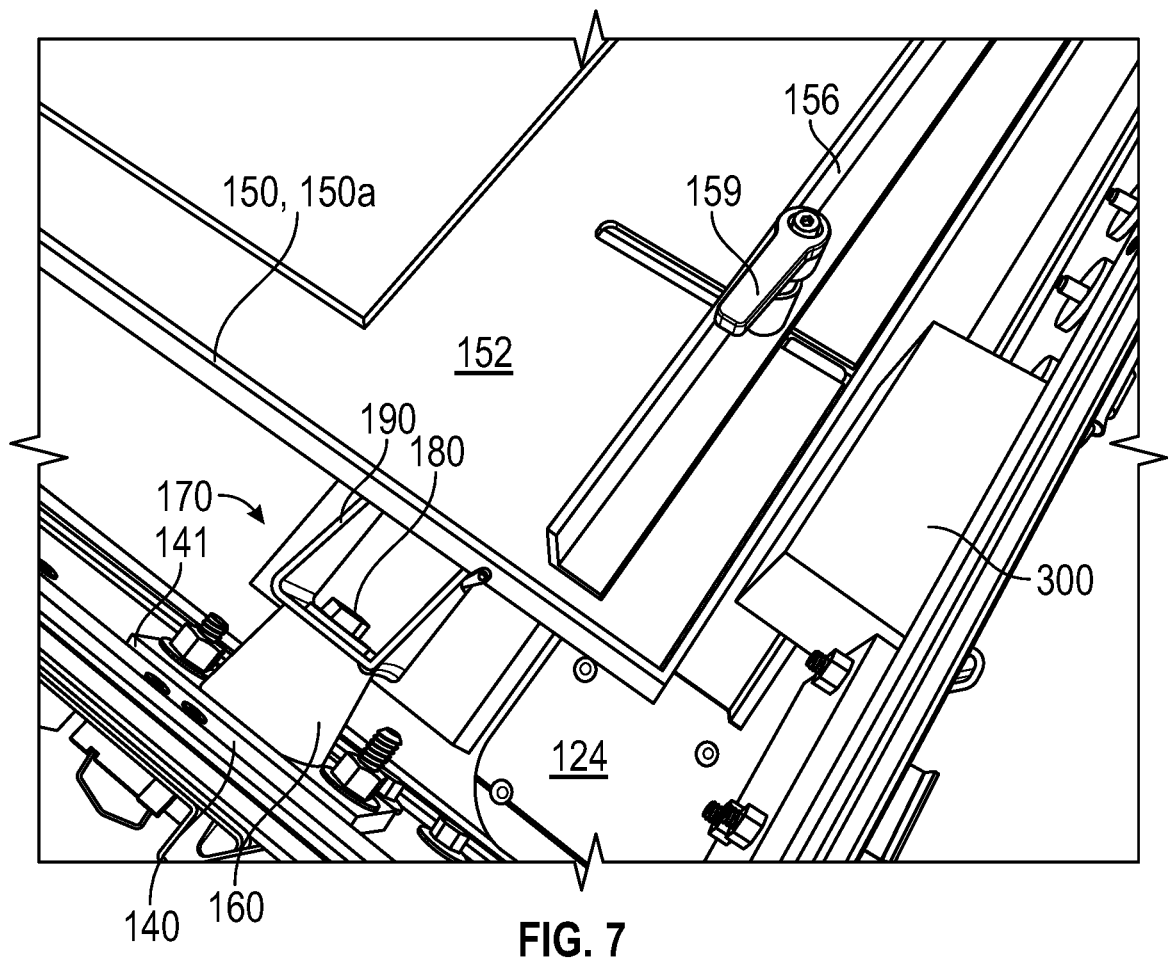
FIG. 7 is an enlarged detail partially schematic view of the lower case body of the transport case of FIG. 1.

Referring to FIGS. 4-7, the lower frame 150 is secured to and within the lower case body 140. A securing assembly 170 includes a fastener engaged with the lower case body 140 and the lower frame 150. The lower frame 150 is preferably secured to the lower case body 140 by a plurality of the securing assemblies 170, with six securing assemblies 170 as shown. Referring to FIG. 7, in each securing assembly 170, the fastener, a screw 180 in the illustrated embodiment, is disposed between and engages the lower case body 140 at a base plate 141 and the lower frame 150 at a mounting leg 190 fixed to the lower frame 150. (The base plates 141 are also shown in FIG. 3.) The screw 180 passes through a damper in the form of a grommet 160 or other elastic body (or more complex damper, if desired), here the grommet 160 mounted on the screw 180 by way of a bore through the grommet 160. The base plate 141 may include a tubular foundation for engaging and locating the grommet 160. The grommet 160 thus is disposed between the lower case body 140 and the lower frame 150 to cushion and flexibly resist relative movement between the lower frame 150 and the lower case body 140. The grommet 160 may be a standard grommet with an elastic body with a bore therethrough. Each grommet 160 is configured and positioned to act as a damper to isolate the lower frame 150 from movements of or impacts upon the lower case body 140.

At least one additional damper in the form of an elastic body 300, 302, 304, 306, 308 is disposed between the lower frame 150 and the lower case body 140. As with the grommets 160, the elastic bodies 300, 302, 304, 306, 308 cushion and flexibly resist relative movement between the lower frame 150 and the lower case body 140 and act as a damper to isolate the lower frame 150 from movements of or impacts upon the lower case body 140. One or more of the elastic bodies 300, 302 may be fixed to the lower case body 140 between the inner surface 144 and the lower frame 150. A gap may be provided between at least one elastic body 300, 302and the lower case body 140, so that the lower frame 150 and the video monitor 110 are isolated from vibrations and smaller impacts to the transport case 100 and/or the lower case body 140. Further elastic bodies 304, 306 may be fixed to the upper frame 220 and disposed between the upper frame 220 and upper case body 208. The elastic bodies 304, 306 are preferably sized to be spaced from the upper case body 208 under an unloaded condition and to make contact with the upper case body 208 when the transport case 100 has been subjected to an external load or impact. Aat least one further elastic body 308, of which six are shown, is fixed to the inner surface 144 of the base plate 141 below lower-frame base plate 152. The elastic body 308 may be preferably sized to be spaced from the lower-frame base plate 152 under an unloaded condition and to make contact with the lower-frame base plate 152 when the transport case 100 has been subjected to an external load or impact. Alternatively or in addition, the elastic body 308 may be placed under one of the grommets 160 to limit travel thereof under loading. Although the locations for the elastic bodies described herein are to be advantageous, the elastic bodies may alternatively be placed differently. For example, one or more of the elastic bodies 300, 302 may be fixed to the lower frame 150 between the inner surface 144 and the lower frame 150. A gap may be provided between at least one elastic body 300, 302and the lower frame 150, so that the lower frame 150 and the video monitor 110 are isolated from vibrations and smaller impacts to the transport case 100 and/or the lower case body 140. Further elastic bodies 304, 306 may be fixed to the upper case body 208 and disposed between the upper frame 220 and upper case body 208. The elastic bodies 304, 306 may be preferably sized to be spaced from the upper frame 220 under an unloaded condition and to make contact with the upper frame 220 when the transport case 100 has been subjected to an external load or impact. At least one further elastic body 308 may be fixed to the lower-frame base plate 152 between the lower-frame base plate 152 and the inner surface 144 of the base plate 141 below lower-frame base plate 152. The elastic body 308 may be preferably sized to be spaced from the inner surface 144 under an unloaded condition and to make contact with inner surface 144 when the transport case 100 has been subjected to an external load or impact.

Figure 15:
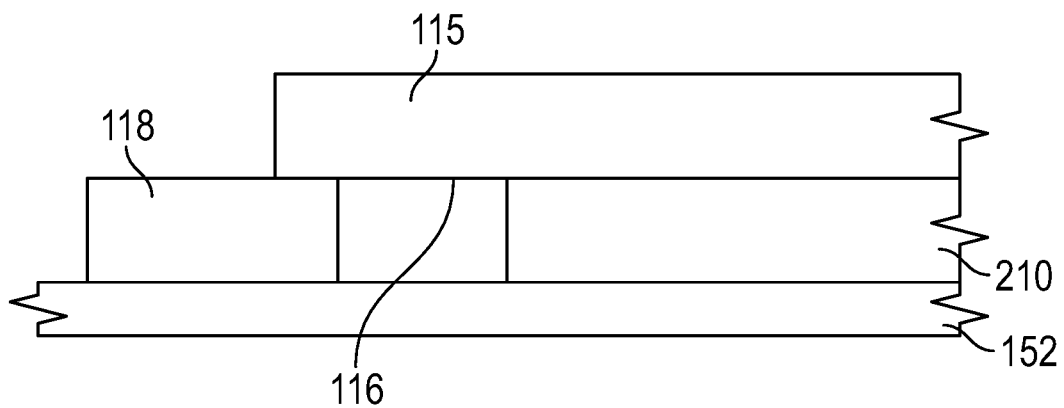
FIG. 15 is a partially schematic magnified partial view of the transport case and video monitor of FIG. 6.

Referring to FIGS. 4, 5, 14, and 15 a pressure plate 210 is located on the lower-frame base plate 152 in facing engagement with the lower-frame base plate 152. The pressure plate 210 faces upwardly from the lower-frame base plate 152 and thus is configured to make contact with the screen area 116 of the video monitor 110 when the video monitor 110 is in a working position (with screen area 116 facing downward) in the transport case 100. The pressure plate 210 is preferably deformable and non-abrasive but is relatively stiff and is of sufficient height to make contact with the screen area 116 of a video monitor 110 by having a height exceeding the depth of the bezel 118 so that when the video monitor 110 rests on the lower-frame base plate 152, the pressure plate 210 makes contact with at least a portion of the screen area 116, as shown in FIG. 15. In some embodiments, the pressure plate may have a thickness of about 0.25 inch (0.635 cm) to about 0.5 inch (1.27 cm). The pressure plate 210 preferably may contact and be elastically deformed or compressed by the screen area 116 of the video monitor 110, thereby exerting a force on the screen area 116 to reduce the deformation of the screen panel 115 in response to a load imposed on the video monitor 110. The pressure plate 210 as shown is a body of an elastic material such as foam core board. The pressure plate 210 may be made from foam core or other elastic materials with sufficient flexibility to avoid scratching the screen area 116 in the event that dust or dirt is trapped between the screen area and the pressure plate. The material for the pressure plate 210 may be selected to give the pressure plate 210 sufficient strength and/or stiffness to support the screen area 116 and the screen 115 and avoid damage to the screen 115 by excessive flexing thereof, but sufficient flexibility to avoid imparting a local stress if debris is present between the screen area 116 and the pressure plate 210. The transport case 100 may include the single pressure plate (as shown) or may alternatively include a plurality of pressure plates (such as strips of foam core board or another suitable material) located on the lower-frame base plate 152. In some embodiments, the lower frame 150 has a lower frame perimeter wall 154 including a first side wall 156, a second side wall 157, and a third side wall 158. The pressure plate 210, or a plurality of pressure plates 210, may make contact with an entire screen area 116 of the video monitor 110, or may make contact with less than the entire screen area-for example, 5 percent, 10 percent, 20 percent, 30 percent, 40 percent, 50 percent, 60 percent, 70 percent, 80 percent, or 90 percent of the screen area 116, as needed to prevent deformation of the screen area 116 of the video monitor 110 under loading.

In some embodiments, the grommet 160 or other damper is disposed between the lower case body and the lower frame. In the illustrated embodiment, this is accomplished by providing a plurality of grommets 160 disposed between the lower case body 140 and first and second sides 150*a*, 150*b* of the lower frame 150.

Referring to FIGS. 4-7, an upper frame 220 is configured to securely attach to the lower frame 150 and configured to extend transversely at least partially across the lower frame 150 to hold the screen area 116 in facing engagement with the pressure plate 210. In some embodiments, the upper frame 220 is configured to extend from the first side 150*a* to the second side 150*b* of the lower frame 150 and securely attach to the second side 150*b*. The upper frame 220 in the illustrated embodiment is extendable, as described in more detail below, so that the upper frame 220 may be usable as a component of transport cases having respective lower frames of varying sizes to suit different size ranges of video monitors.

In some embodiments, including the illustrated embodiment, the transport case 100 includes a monitor mount 310 including a mounting frame 312 configured to be secured to the back portion 112 of the video monitor 110 and to the upper frame 220. Alternatively, the upper frame 220, or another embodiment of an upper frame, may attach to the video monitor directly in the same manner as monitor mount 310, using fasteners to engage standard mounting holes or other compatible elements disposed on the back portion 112 of the video monitor 110.

In some embodiments, the transport case 100 includes a means for securing the upper frame 220 to the lower frame 150 in the form of a clamp, which may be a butterfly clamp as shown but may be any known clamping mechanism. In either case the means for securing may be configured to secure the upper frame to the lower frame and may be configured to urge the upper frame 220 toward the lower frame 150. In the illustrated embodiment, as best seen in the partially schematic detail view of FIG. 12, two clamps 246 engage both the upper frame 220 at the cross member 248 and the lower frame 150 at the second side wall 157. The means for securing thereby may urge upper frame 220 and the attached video monitor 110 in a direction toward the pressure plate 210 so that the screen area 116 of the video monitor 110, opposite the back portion 112 thereof, bears against the pressure plate 210.

In some embodiments, the upper frame 220 is pivotably attached to the lower frame 150 by a pivoting joint such as a joint including one or more hinges 330. The upper frame 220 is preferably configured to engage and support the video monitor 110 in an upright position upon the video monitor 110 being lowered onto a portion of the upper frame 220. Alternatively, the upper frame 220 may have clamps for engaging both the first side 150*a* and the second side 150*b* of the lower frame 150.

Referring to FIGS. 4-7, 12, and 13, the upper frame 220 is configured to engage the mounting frame 312 when the mounting frame 312 is in a working position attached to the video monitor 110 and thereby support the video monitor 110 in an upright position. The upper frame 220 is shown in an upright position in FIG. 4. The video monitor 110 and the attached monitor mount 310 and mounting frame 312 can be lowered together onto a portion of the upper frame 220. Referring to FIGS. 4-6, an embodiment of the upper frame 220 includes a base member 222 pivotably attached to the lower frame 150 at a first side 150*a* thereof. A second mounting-frame-upper-frame-connecting body in the form of a mounting tab 224 (two are shown) is connected to the base member 222 and in the embodiment shown is mounted to a pair of principal members 240. Each principal member 240 in turn includes a first telescoping member 242 and a second telescoping member 244, which are securable to provide for length adjustment of the principal member 240. The second telescoping members 244 may be adjusted to extend from the first telescoping members by a selected distance and then locked relative to the first telescoping members using a threaded fastener, compressive collar, or the like (not shown).

The second mounting-frame-upper-frame connecting body of the upper frame 220 is configured to engage with the first mounting-frame-upper-frame connecting body. In the illustrated embodiment, each mounting tab 224 is alignable and engageable with one of the mounting slots 320 of the mounting frame 312. The first mounting-frame-upper-frame connecting body and the second mounting-frame-upper-frame connecting body may comprise a protrusion extending from the lower frame 150 and engageable with a corresponding aperture of the mounting frame 312. Alternatively, the first mounting-frame-upper-frame connecting body and the second mounting-frame-upper-frame connecting body may comprise an-and aperture provided in the lower frame 150 and engageable to accept a corresponding portion of the mounting frame 312 upon the video monitor and the mounting frame being lowered onto the upper frame, with the upper frame 220 in a vertical orientation as shown in FIGS. 4. In this configuration, the video monitor 110 may rest on and be supported on the upper frame 220 but is not secured to the upper frame 220. The mounting studs 340 of the monitor mount 310 are aligned with and pass through mounting apertures 228 of the upper frame 220. The mounting studs 340 may then be used in combination with wing nuts or other suitable hardware to secure the monitor mount 310 and the attached video monitor 110 to the upper frame 220. Preferably, and as shown in FIGS. 1-11, the mounting apertures 228 may have an irregular shape alignable with a wing nut 342 rotatably attached to each mounting stud. Each mounting aperture 228 is configured to align with the mounting stud 340 when the mounting tabs 224 of the upper frame are engaged with the slots 320 of the mounting frame.

In some embodiments, the upper frame includes a support element, the support element comprising a body with a support surface extending horizontally when the upper frame 220 is in an upright position. The support element is configured to engage the mounting frame 312 and/or the video monitor 110 to provide vertical support to the video monitor 110.

Figure 8:
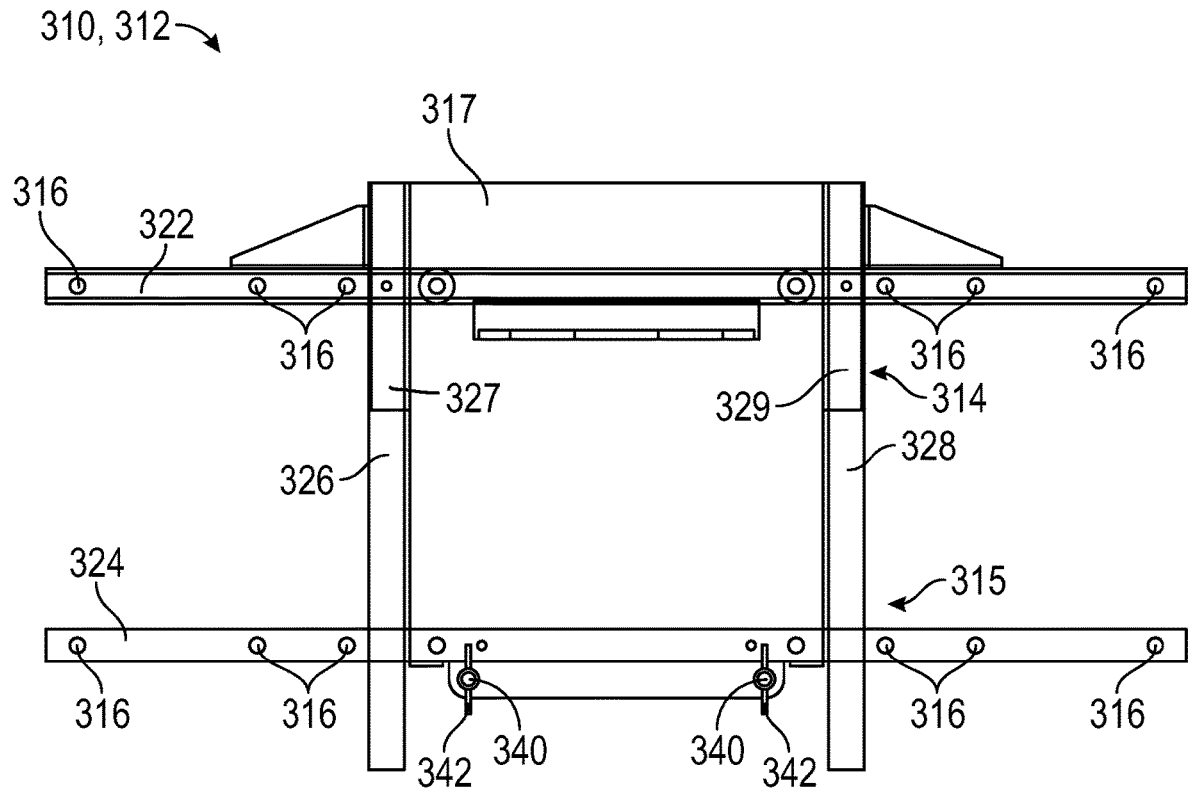
FIG. 8 is a rear partially schematic view of a monitor mount according to the present disclosure.
Figure 9:
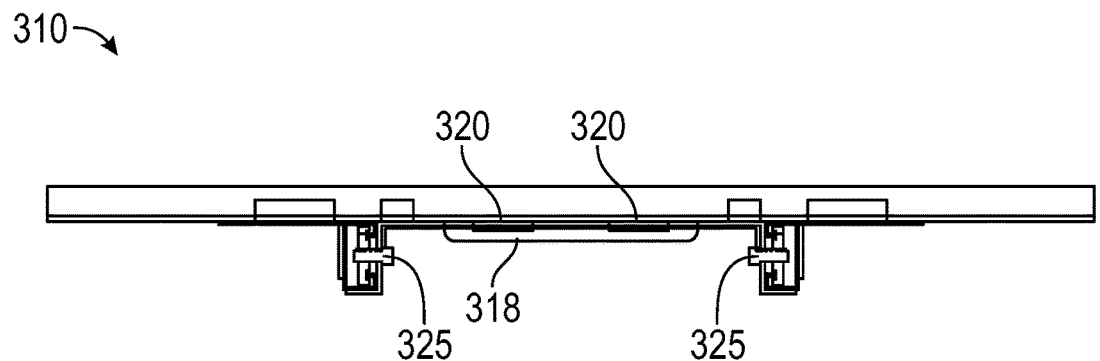
FIG. 9 is a top plan partially schematic view of the monitor mount of FIG. 8.

Referring to FIGS. 8 and 9, the mounting frame 312 includes a first frame portion 314 having a plurality of fastener apertures 316 extending therethrough for fastening the mounting frame 312 to the video monitor 110. The fastener apertures 316 are preferably configured to match the hole spacing, particularly the horizontal spacing, of standardized mounting holes incorporated into back portions of a variety of video monitors. A second frame portion 315 is slidably connected to the first frame portion 314 and securable with respect thereto by set screws, allowing for vertical alignment of fastener apertures 316 with upper and lower rows of standardized mounting holes, particularly where the mounting frame 312 is adjustable for use with mounting holes that follow different standards requiring different vertical spacing. The mounting frame 312 includes a first mounting-frame-upper-frame connecting body in the form of a ledge 318 having a slot 320, with two adjacent slots 320 being shown. A mounting stud 340 extends from the mounting frame 312; two mounting studs 340 are shown.

In some embodiments, the mounting frame 312 includes an upper horizontal frame leg 322, a lower horizontal frame leg 324, a lower left vertical frame leg 326 slidably and securably engaged with an upper left vertical frame leg 327, and a lower right vertical frame leg 328 slidably and securably engaged with an upper right vertical frame leg 329. The upper left vertical frame leg 327 and the upper right vertical frame leg 329 are spaced apert and attached to the upper horizontal frame leg 322. The lower right vertical frame leg 328 and the lower left vertical frame leg 326 are attached to the lower horizontal frame leg 324. A connecting plate 317 extends between respective vertical frame legs, with the connecting plate 317 having the slots 320 and the ledge 318 projecting horizontally and rearwardly. The ledge 318 includes tab apertures in the form of the two slots 320.

Referring to FIGS. 4-7 and 13, in the illustrated embodiment, the upper frame 220 includes a base in the form of a base member 222 pivotably attached to the lower frame 150, preferably along one of the long sides thereof as a pivoting joint, which may be formed by one or more hinges 330 connecting the base member 222 to the first side 150a of the lower frame 150. A principal member 240 extends from the base member 222 and is configured to extend across at least as portion of the lower frame 150—for example, from the first side 150a to proximate the second side 150b thereof, as shown. A support plate 226 has a mounting tab 224 (two are shown) projecting vertically therefrom and adapted to be received in the tab aperture (slots 320) of the connecting plate of the mounting frame 312. Mounting apertures 228 are configured to align with the mounting stud 340 when the mounting tabs 224 are received in the slots 320 of the connecting plate. The support plate 226 is slidably attached and securable with respect to the principal member 240 by being is slidably attached and securable with respect to the first telescoping members 242 and/or with respect to the second telescoping members 244 by collars 249, which are fixed to the support plate 226 and may be loosened or tightened to allow or prevent the support plate 226 to slide along the first telescoping members 242 and/or with respect to the second telescoping members 244. An L-shaped cross member 248 joins the second telescoping members 244 at an end thereof opposite the base member 222. The adjustability of the support plate 226 allows the upper frame 220 to adapt to a variety of video monitors having a mounting holes mounted at a variety of vertical locations on the back portion of the video monitors (when the video monitor is upright). For example, the upper frame 220 may be adjusted to accommodate a video monitor with a row of mounting holes arranged six inches from a top edge of the back portion of the video monitor, and to accommodate a different video monitor with a row of mounting holes arranged four inches from a top edge of the back portion of the video monitor, even if both video monitors are the largest size of video monitor that may be fitted within the lower frame 150.

Referring to FIGS. 4-7, at least two of the first side wall 156, the second side wall 157, and the third side wall 158 are slidably and securably mounted with respect to the lower-frame base plate 152. Thumbscrews 159 are provided to releasably engage each of the first side wall 156, the second side wall 157, and the third side wall 158 to allow the first side wall 156, the second side wall 157, and the third side wall 158 to slide to a desired position for engaging a video monitor and then to fix the first side wall 156, the second side wall 157, and the third side wall 158 in place in that desired position. In that way, the transport case 100 may be adjusted to that the first side wall 156, the second side wall 157, and the third side wall 158 engage a perimeter of the video monitor 110.

Figure 2:
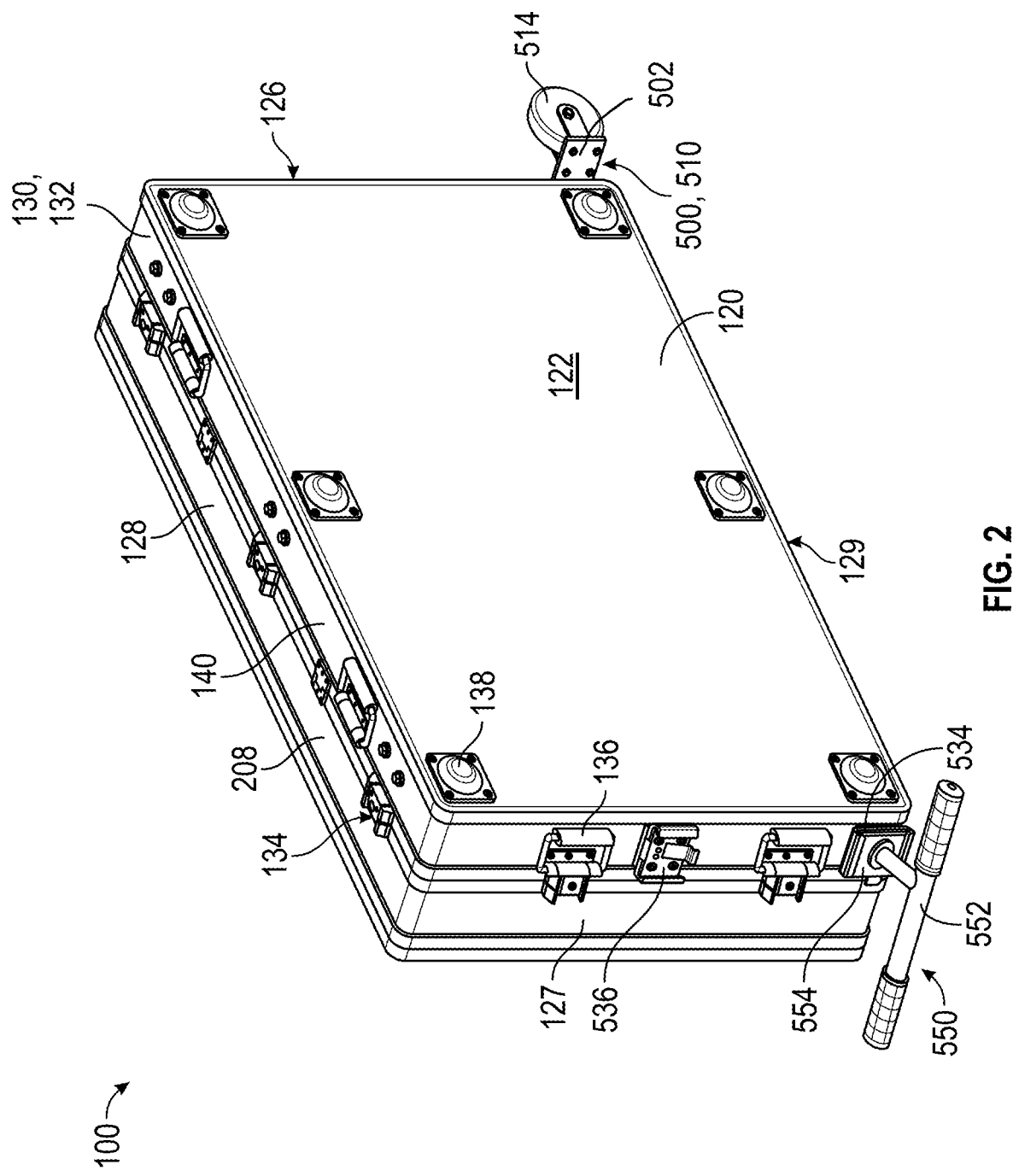
FIG. 2 is a rear perspective partially schematic view of the transport case of FIG. 1.

Referring to FIGS. 1, 2, 10, and 11, in some embodiments, the transport case includes a rollable platform 500 configured to be removably securable to the transport case 100. The rollable platform 500 has an upper platform surface 502 and a lower platform surface 504; a first caster 510, the first caster 510 has a first wheel 514. The first caster 510 is non-swiveling and extends below the lower platform surface. The second caster 512 has a second wheel 516. The second caster 512 is also non-swiveling and oriented parallel to the first caster 510. The first caster 510 and the second caster 512 provide a convenient method for attaching wheels to the rollable platform 500; however, the rollable platform 500 may have wheels attached with or without using casters, such as by including an axle with a wheel at each end thereof. The second caster 512 extends below the lower platform surface 504. A first attachment fixture 530, for example, the illustrated standard fixture with two parallel tracks and an elastic tab, is located on an exterior of the transport case 100. The first attachment fixture 530 is configured for removably securing the rollable platform 500 to the transport case 100 in a first orientation, with the first caster 510 and the second caster 512 aligned parallel with respect to at least one of the first outer panel 120 or the second outer panel, as shown in FIGS. 1 and 2, so that the transport case 100 is rollable in a generally upright or edgewise orientation. A second attachment fixture 532, which in the illustrated embodiment is of the same configuration as the first attachment fixture 530 except for the orientation thereof, is also located on the exterior of the transport case but is configured for removably securing the rollable platform 500 to the transport case in a second orientation (see FIGS. 1 and 2), with the rollable platform 500 transversely with respect to the first orientation, so that the first caster 510 and the second caster are aligned perpendicularly with respect to at least one of the first outer panel 120 or the second outer panel, allowing the transport case to be rolled in a generally horizontal orientation. The transport case 100 also includes in some embodiments a handle body 550 including a handlebar 552 and a handle base 554 fixed to the handlebar 552. The handle base 554 is selectably securable to the exterior of the transport case 100 with the handlebar 552 oriented perpendicularly with respect to at least one of the first outer panel 120 or the second outer panel 200, and is selectably securable with the handlebar 552 oriented parallel with respect to at least one of the first outer panel 120 or the second outer panel 200. The handlebar 552 may be set asymmetrically with respect to the handle base 554, as shown.

The transport case 100 also may include a third attachment fixture 534 located on the exterior of the transport case 100, the third attachment fixture 534 being configured for removably securing the handle base 554 to the exterior of the transport case 100 with the handlebar 552 oriented perpendicularly with respect to at least one of the first outer panel 120 or the second outer panel 200; and a fourth attachment fixture 536 located on the exterior of the transport case 100, the fourth attachment fixture 536 being configured for removably securing the handle base 554 to the exterior of the transport case 100 with the handlebar 552 oriented parallel with respect to at least one of the first outer panel 120 or the second outer panel 200. The fourth attachment fixture 536 differs from the third attachment fixture 534 only in orientation.

Referring to FIGS. 1, 2, 10, and 11, the exterior of the transport case 100 defines a rectangular body as shown, or alternatively a generally rectangular body, having a top main surface formed by the second outer panel, a bottom main surface formed by the first outer surface 122 of the first outer panel 120, a first end surface 126, a second end surface 127, a first side surface 128, and a second side surface 129. The first attachment fixture 530 and the second attachment fixture 532 are preferably both located on the first end surface 126; and the third attachment fixture 534 and the fourth attachment fixture 536 are both located on the second end surface 127.

Figure 10:
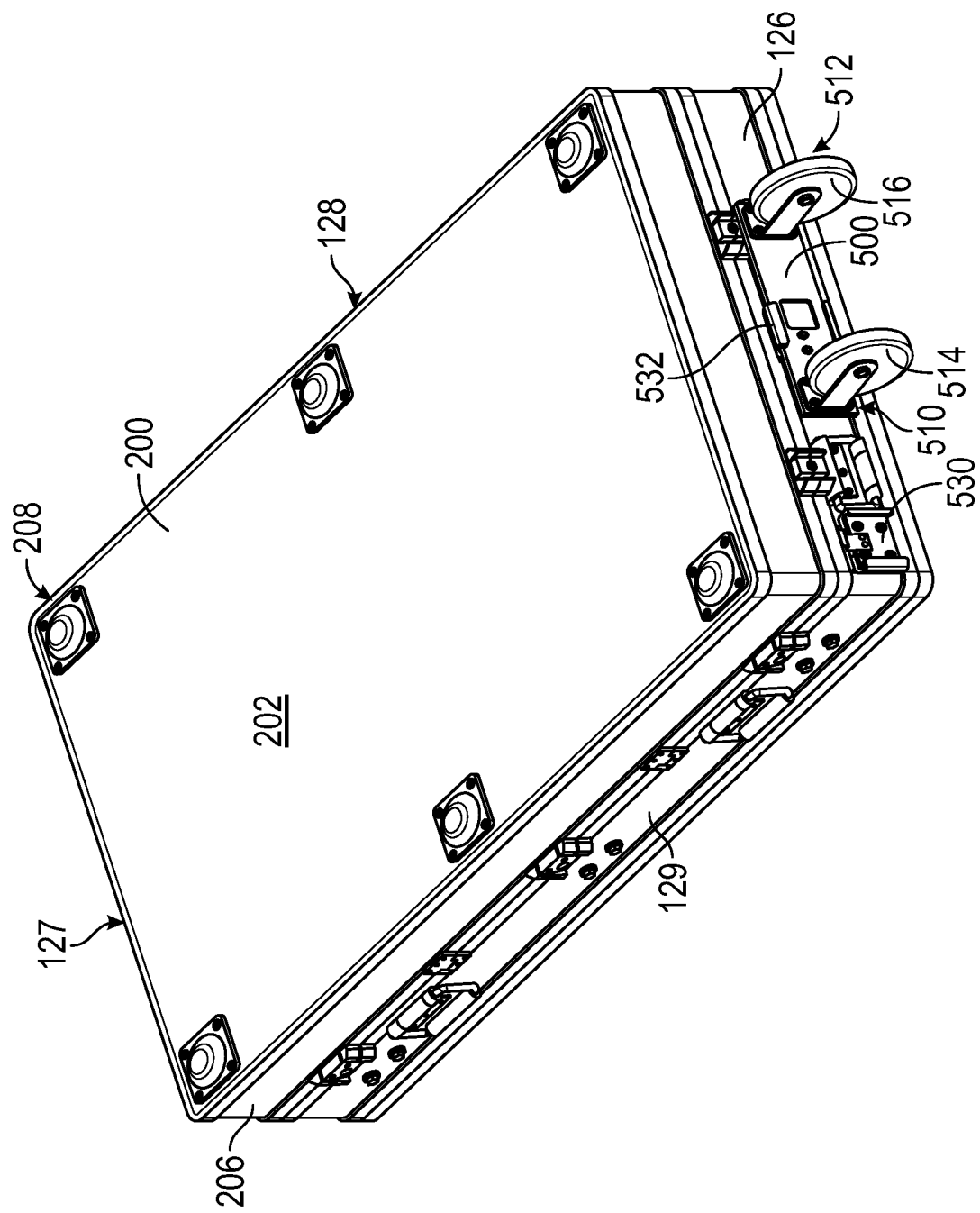
FIG. 10 is a front perspective partially schematic view of the transport case of FIG. 1 in a horizontal orientation.
Figure 11:
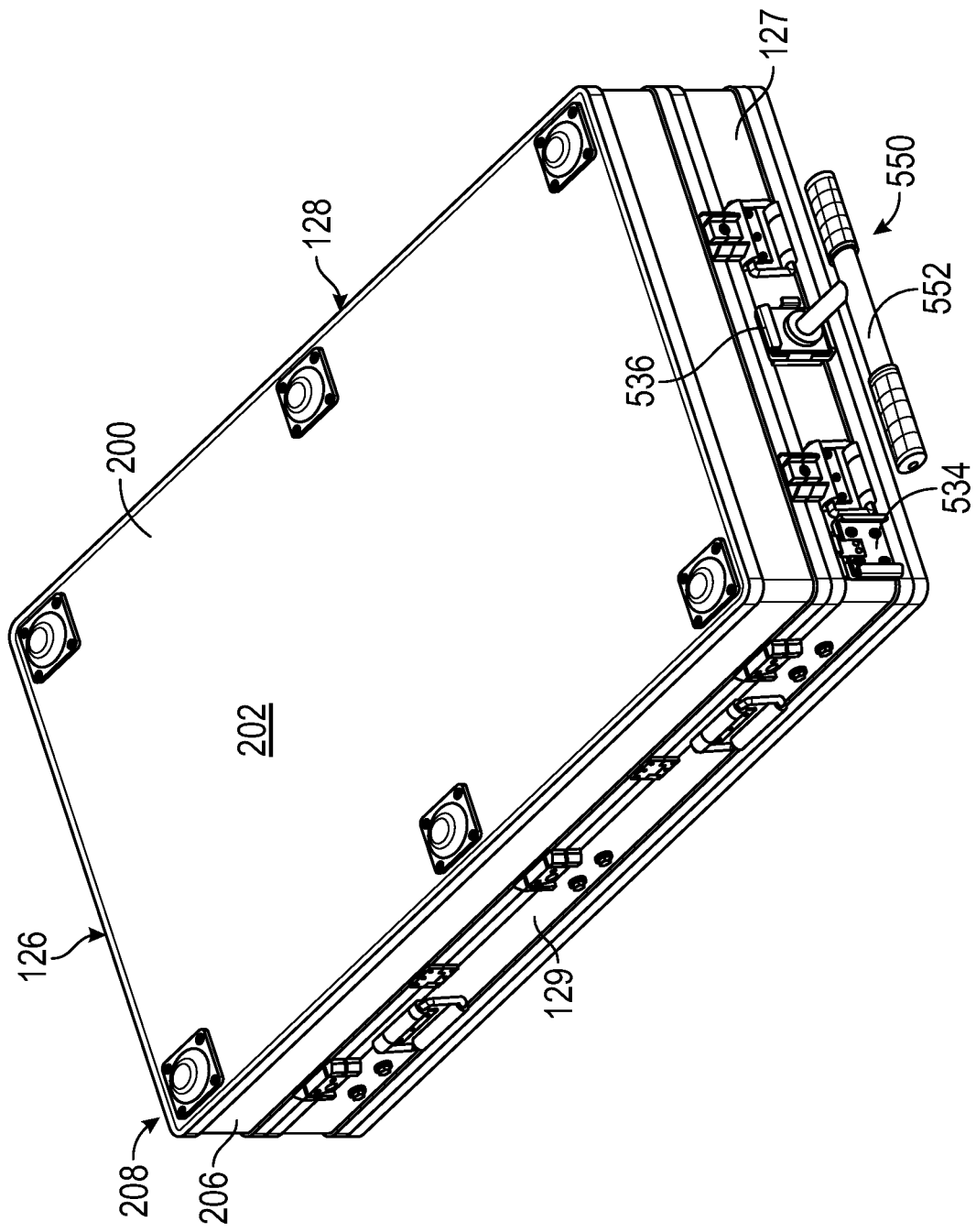
FIG. 11 is a rear perspective partially schematic view of the transport case of FIG. 1 in a horizontal orientation.
Figure 12:
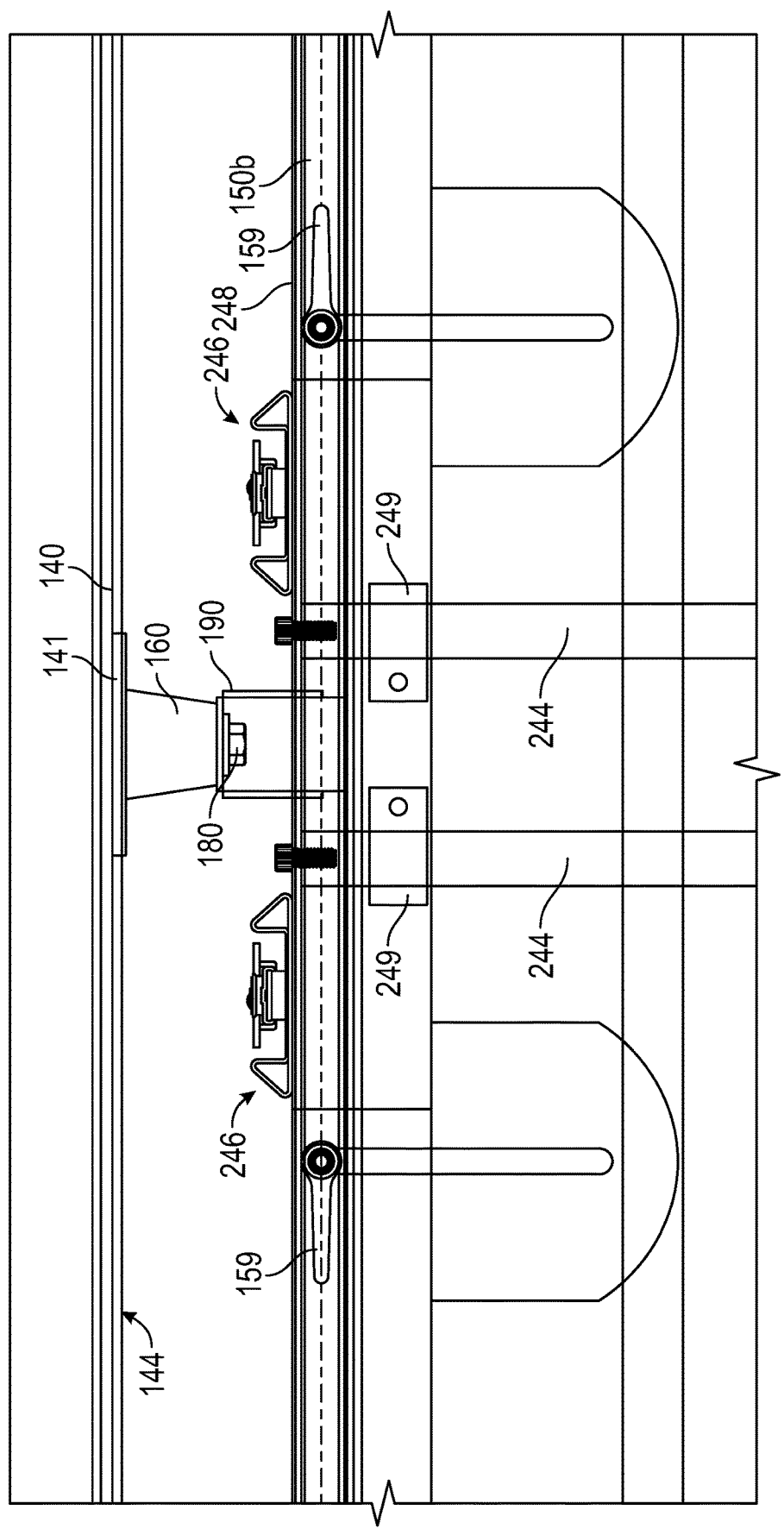
FIG. 12 is a detail partially schematic view of a connection between the upper and lower frames of the transport case of FIG. 1.
Figure 13:
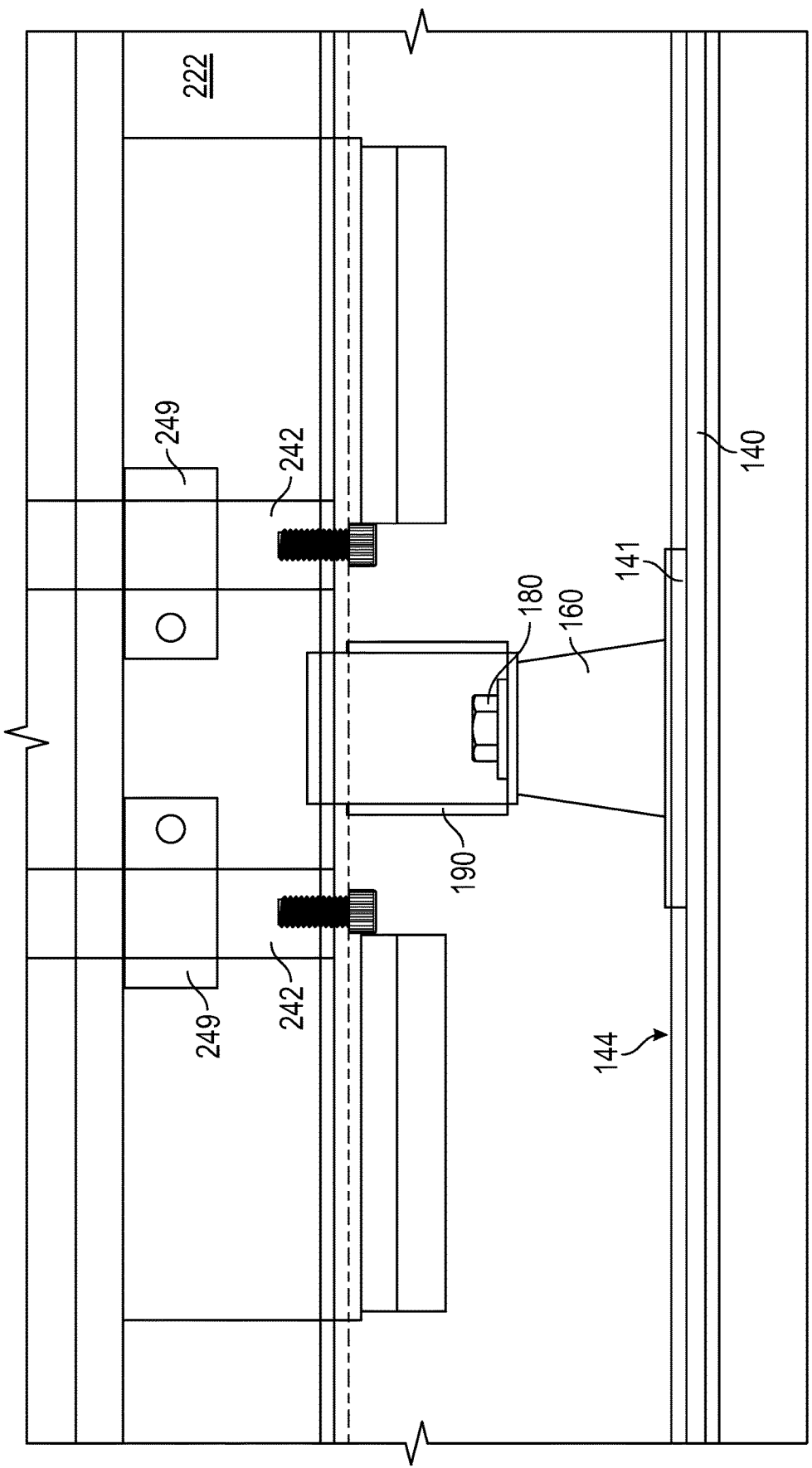
FIG. 13 is a detail partially schematic view of a connection between the upper and lower frames of the transport case of FIG. 1.
Figure 14:
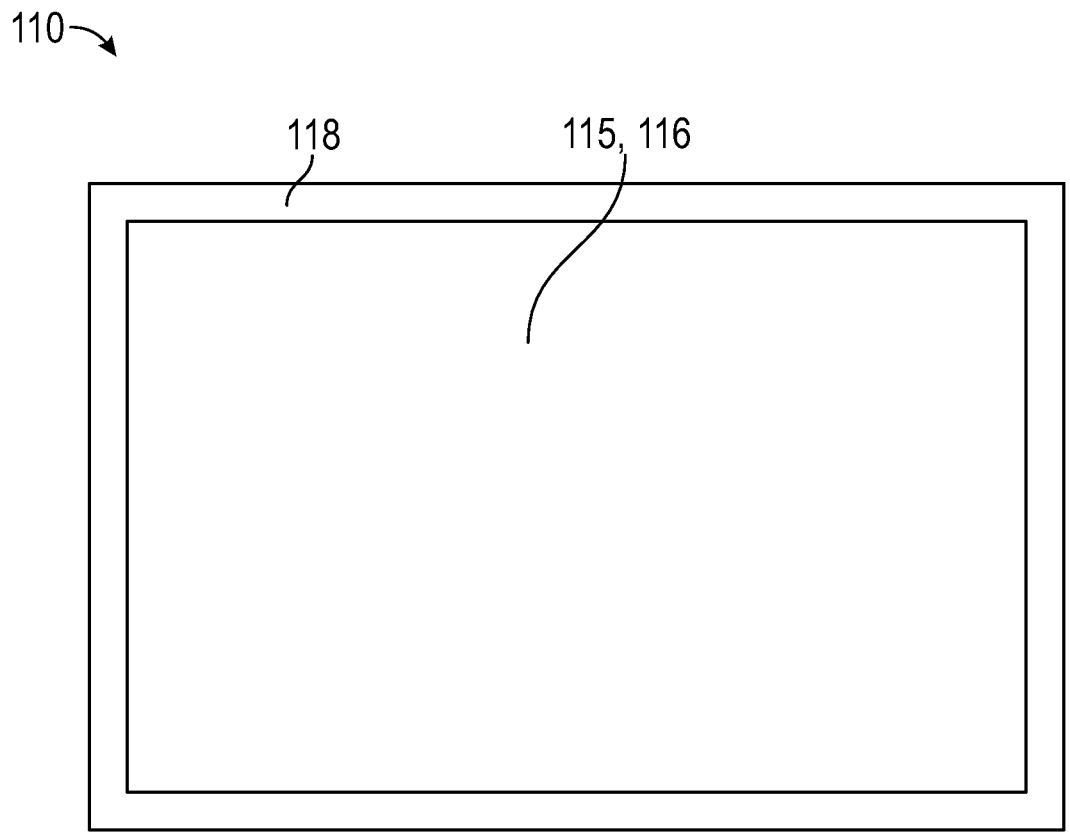
FIG. 14 is s partially schematic view of the video monitor of FIG. 6.

In some embodiments of the transport case 100, the handle base 554 is selectably securable to the exterior of the transport case 100 with the handlebar 552 oriented perpendicularly with respect to at least one of the first outer panel 120 or the second outer panel 200 and is selectably securable with the handlebar oriented parallel with respect to at least one of the first outer panel 120 or the second outer panel 200. This allows for the handlebar 552 to the attached to the transport case 100 for rolling of the transport case 100 in a generally vertical orientation, suitable for moving through narrow areas, as shown in FIGS. 1 and 2. Alternatively, following removal, re-orientation, and re-attachment of the rollable platform 500 and the handle body 550, the transport case may be rolled using the rollable platform in a generally horizontal orientation, as shown in FIGS. 10 and 11, which is more stable and is easier to handle when there is room to handle the transport case 100 in the generally horizontal orientation. The generally horizontal orientation also eases transport, stacking, palletizing, and storage of one or more transport cases 100.

In use, the transport case 100 may be used to protect a video monitor such as the video monitor 110 as follows. First, the monitor mount 310 is attached to back portion 112 of the video monitor 110. Screws may be passed through upper fastener apertures 316 of the first (upper) frame portion 314 to engage an upper row of mounting holes on the video monitor 110. The monitor frame 312 may be adjusted so that lower fastening apertures 316 of the second frame portion 315 (lower) align with a lower row of mounting holes of the video monitor 110, and screws may be passed through the apertures 316 of the lower row to engage the lower row of mounting holes of the video monitor 110. The first frame portion 314 and the second frame portion 315 may be slidably connected to allow for adjustment thereof in the vertical direction and may be fixed to one another by set screws 325.

The video monitor 110 with the monitor mount 310 attached thereto may then be attached to the upper frame 220 of the transport case 100. The lower case body 140 may be placed on a ground surface, and the upper frame 220 may be pivoted into an upright position, as shown in FIG. 4. The video monitor 110 with the attached monitor mount 310 may be lowered onto the upper frame 220 so that the mounting tabs 224 of the support plate 226 of the upper frame 220 engage the slots 320 of the monitor mount 310, so that the video monitor 110 is supported, via the monitor mount 310, on the upper frame 220. In this arrangement, the mounting studs 340, with the wing nuts 342 aligned vertically, align with and pass through the mounting apertures 228 of the upper frame 220. The wing nuts 342 on the mounting studs may be rotated (preferably about one fourth of a rotation) to secure the video monitor 110 to the upper frame 220. The upper frame 220 may then be pivoted downwardly into the lower case body 140 until the video monitor 110, with the screen area 116 and the bezel 118 facing downwardly, rests on the lower-frame base plate 152 and/or on the pressure plate 210, and the pressure plate 210 makes contact with the screen area 116, as shown in FIG. 15.

Upon a first use of the transport case 100 with a video monitor 110 that is new or different from a previously accommodated video monitor, the first side wall 156, the second side wall 157, and the third side wall 158 may be released using the thumbscrews 159 and moved into position for the largest monitor that may be handled by the particular transport case. The video monitor 110 and the upper frame 220 may then be lowered into the lower case body 140. The position of the support plate 226 along the first and second telescoping members 242, 244 may be adjusted and fixed so that the video monitor 110 abuts the first side 150a of the lower frame 150 when the video monitor 110 is in the lowered position in the lower case body 140. The first side wall 156, the second side wall 157, and the third side wall 158 may then be slid into position to abut the edges of the video monitor 110; the first side wall 156, the second side wall 157, and the third side wall 158 may then be locked into place using the thumbscrews 159. After these steps are performed, the transport case 100 is set up so that the video monitor 110 may be placed into or removed from the lower case body 140 by pivoting the upper frame 220, without going through the setup steps each time.

In subsequent uses of the transport case 100 with the particular video monitor 110 used to establish the setup, the video monitor 110 may be attached to the upper frame 220 as described above and then lowered into the lower case body 140. Next, the clamps 246 are engaged to secure the upper frame 220 to the lower frame 150, preferably by way of the cross member 248 of the upper frame 220 being clamped to the second side 150b of the lower frame 150. The upper case body 208 is then secured to the lower case body 140 using the clamps 134 or other clamping devices if provided, and the video monitor 110 is ready for transport in the transport case 100. Where appropriate, the rollable platform 500 may be engaged with one of the attachment fixtures 530, 532, 534, 536 in the desired orientation for rolling in either a generally vertical or a generally horizontal orientation, and the handle body 550 in engaged with a compatible fixture 530, 532, 534, 536 to aid handling of the transport case 100 where rolling is practical.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present disclosure as defined by the appended claims.

We claim:

1. A transport case for a video monitor having a screen area and a back portion, the transport case comprising:
   a first outer panel having a first outer surface and a first inner surface;
   a side wall fixed to the first inner surface and extending transversely therefrom, the side wall forming a case perimeter wall, the first outer panel and the side wall together forming a lower case body with an upper opening;
   a lower frame disposed and secured within the lower case body and having a lower-frame base plate;
   a damper disposed between the lower case body and the lower frame;
   a second outer panel having a second outer surface, the second outer panel being configured to attach to the lower case body and thereby cover the upper opening of the lower case body;
   a pressure plate located on the lower-frame base plate in facing engagement therewith and configured to make contact with the screen area of the video monitor when the video monitor is positioned in the transport case;
   an upper frame configured to securely attach to the lower frame and configured to extend transversely at least partially across the lower frame to hold the screen area in facing engagement with the pressure plate; and
   a monitor mount including a mounting frame configured to be secured to the back portion of the video monitor and to the upper frame.

2. The transport case according to claim 1, wherein:
   the lower frame has a lower frame perimeter wall including a first side wall, a second side wall, and a third side wall.

3. The transport case according to claim 2, wherein at least two of the first side wall, the second side wall, and the third side wall are slidably mounted with respect to the lower-frame base plate.

4. The transport case according to claim 1, wherein the damper includes at least one of a grommet and an elastic body secured between each side of the lower frame and the lower case body.

5. The transport case according to claim 1, wherein the upper frame is configured to extend from a first side of the lower frame to a second side of the lower frame and securely attach to the second side of the lower frame.

6. The transport case according to claim 1, wherein the upper frame is configured to engage the mounting frame when the mounting frame is in a working position attached to the video monitor and thereby support the video monitor in an upright position, whereby the video monitor and the mounting frame can be lowered together onto a portion of the upper frame.

7. The transport case according to claim 1, wherein:
   the mounting frame includes:
      a first frame portion having a plurality of fastener apertures extending therethrough for fastening the mounting frame to the video monitor;
      a second frame portion connected to the first frame portion and providing a first mounting-frame-upper-frame connecting body; and
      a mounting stud extending from the mounting frame; and
   the upper frame includes:
      a base member pivotably attached to the lower frame; and
      a second mounting-frame-upper-frame-connecting body connected to the base member and configured to engage with the first mounting-frame-upper-frame connecting body, and a mounting aperture configured to align with the mounting stud when the second mounting-frame-upper-frame-connecting body is engaged with the first mounting-frame-upper-frame connecting body.

8. The transport case according to claim 7, wherein the upper frame includes a support element, the support element extending horizontally when the upper frame is in an upright position, the support element configured to engage the mounting frame to provide vertical support to the video monitor.

9. The transport case according to claim 1, wherein:
   the mounting frame includes:
      an upper horizontal frame leg, a lower horizontal frame leg, a left vertical frame leg, and a right vertical frame leg, with the left vertical frame leg attached to the upper horizontal frame leg and the lower horizontal frame leg, and with the right vertical frame leg attached to the upper horizontal frame leg and the lower horizontal frame leg;
      a connecting plate extending between the left vertical frame leg and the right vertical frame leg, the connecting plate having a mounting aperture and a ledge projecting horizontally and rearwardly, the ledge being positioned between the left vertical frame leg and the right vertical frame leg, and with the ledge including a tab aperture;
      a plurality of fastener apertures extending through the mounting frame for fastening the mounting frame to the video monitor; and
      a mounting stud extending from the mounting frame; and
   the upper frame includes:
      a base pivotably attached to the lower frame;
      a principal member extending from the base and extendable across the lower frame from a first side to proximate a second side thereof; and
      a support plate having a mounting tab projecting vertically therefrom and adapted to be received in the tab aperture of the connecting plate of the mounting frame, and a mounting aperture configured to align with the mounting stud when the mounting tab is received in the tab aperture of the connecting plate.

10. The transport case according to claim 9, wherein the support plate is slidably mounted to the principal member and releasably securable to the principal member.

11. A transport case for a video monitor having a screen area and a back portion, the transport case comprising:
    a first outer panel having a first outer surface and a first inner surface;
    a side wall fixed to the first inner surface and extending transversely therefrom, the side wall forming a case perimeter wall, the first outer panel and the side wall together forming a lower case body with an upper opening;

a lower frame disposed and secured within the lower case body and having a lower-frame base plate;

a damper disposed between the lower case body and the lower frame;

a second outer panel having a second outer surface, the second outer panel being configured to attach to the lower case body and thereby cover the upper opening of the lower case body;

a pressure plate located on the lower-frame base plate in facing engagement therewith and configured to make contact with the screen area of the video monitor when the video monitor is positioned in the transport case;

an upper frame configured to securely attach to the lower frame and configured to extend transversely at least partially across the lower frame to hold the screen area in facing engagement with the pressure plate; and a means for securing the upper frame to the lower frame, the means for securing configured to urge the upper frame toward the lower frame, thereby urging the video monitor in a direction toward the pressure plate so that the screen area bears against the pressure plate.

12. The transport case according to claim 11, wherein the upper frame is pivotably attached to the lower frame.

13. The transport case according to claim 12, wherein the upper frame is configured to engage and support the video monitor in an upright position upon the video monitor being lowered onto a portion of the upper frame.

14. A transport case for a video monitor having a screen area and a back portion, the transport case comprising:

a first outer panel having a first outer surface and a first inner surface;

a side wall fixed to the first inner surface and extending transversely therefrom, the side wall forming a case perimeter wall, the first outer panel and the side wall together forming a lower case body with an upper opening;

a lower frame disposed and secured within the lower case body and having a lower-frame base plate;

a damper disposed between the lower case body and the lower frame;

a second outer panel having a second outer surface, the second outer panel being configured to attach to the lower case body and thereby cover the upper opening of the lower case body;

a pressure plate located on the lower-frame base plate in facing engagement therewith and configured to make contact with the screen area of the video monitor when the video monitor is positioned in the transport case;

an upper frame configured to securely attach to the lower frame and configured to extend transversely at least partially across the lower frame to hold the screen area in facing engagement with the pressure plate; and a clamp configured to secure the upper frame to the lower frame and to urge the upper frame toward the lower frame, thereby urging the video monitor in a direction toward the pressure plate so that the screen area bears against the pressure plate.

15. The transport case according to claim 14, wherein the upper frame is pivotably attached to the lower frame.

16. The transport case according to claim 15, wherein the upper frame is configured to engage and support the video monitor in an upright position upon the video monitor being lowered onto a portion of the upper frame.

17. A transport case for a video monitor having a screen area and a back portion, the transport case comprising:

a first outer panel having a first outer surface and a first inner surface;

a side wall fixed to the first inner surface and extending transversely therefrom, the side wall forming a case perimeter wall, the first outer panel and the side wall together forming a lower case body with an upper opening;

a lower frame disposed and secured within the lower case body and having a lower-frame base plate;

a damper disposed between the lower case body and the lower frame;

a second outer panel having a second outer surface, the second outer panel being configured to attach to the lower case body and thereby cover the upper opening of the lower case body;

a pressure plate located on the lower-frame base plate in facing engagement therewith and configured to make contact with the screen area of the video monitor when the video monitor is positioned in the transport case;

an upper frame configured to securely attach to the lower frame and configured to extend transversely at least partially across the lower frame to hold the screen area in facing engagement with the pressure plate; and a rollable platform configured to be removably securable to an exterior of the transport case, the rollable platform including:

a platform base with an upper platform surface and a lower platform surface;

a first caster, the first caster being non-swiveling and extending below the lower platform surface; and a second caster, the second caster being non-swiveling and oriented parallel to the first caster, the second caster extending below the lower platform surface;

wherein the transport case includes:

a first attachment fixture located on the exterior of the transport case, the first attachment fixture being configured for removably securing the rollable platform to the exterior of the transport case with the first caster and the second caster aligned parallel with respect to at least one of the first outer panel or the second outer panel; and a second attachment fixture located on the exterior of the transport case, the second attachment fixture being configured for removably securing the rollable platform to the exterior of the transport case with the first caster and the second caster aligned perpendicularly with respect to at least one of the first outer panel or the second outer panel.

18. The transport case according to claim 17, further comprising:

a handle body comprising a handlebar and a handle base fixed to the handlebar, the handle base being selectably securable to the exterior of the transport case with the handlebar oriented perpendicularly with respect to at least one of the first outer panel or the second outer panel, and selectably securable with the handlebar oriented parallel with respect to at least one of the first outer panel or the second outer panel.

19. The transport case according to claim 17, further comprising:

a handle body comprising a handlebar and a handle base fixed to the handlebar, the handle base being configured to be removably securable to the exterior of the transport case;

wherein the transport case includes:

a third attachment fixture located on the exterior of the transport case, the third attachment fixture being configured for removably securing the handle base to the exterior of the transport case with the handlebar oriented perpendicularly with respect to at least one of the first outer panel or the second outer panel; and a fourth attachment fixture located on the exterior of the transport case, the fourth attachment fixture being configured for removably securing the handle base to the exterior of the transport case with the handlebar oriented parallel with respect to at least one of the first outer panel or the second outer panel.

20. The transport case according to claim 17, wherein:
the exterior of the transport case has a top main surface, a bottom main surface, a first end surface, a second end surface, a first side surface, and a second side surface, and the first attachment fixture and the second attachment fixture are both located on the first end surface.

21. A transport case for a video monitor having a screen area and a back portion, the transport case comprising:
a first outer panel having a first outer surface and a first inner surface;
a side wall fixed to the first inner surface and extending transversely therefrom, the side wall forming a case perimeter wall, the first outer panel and the side wall together forming a lower case body with an upper opening;
a lower frame disposed and secured within the lower case body and having a lower- frame base plate;
a damper disposed between the lower case body and the lower frame;
a second outer panel having a second outer surface, the second outer panel being configured to attach to the lower case body and thereby cover the upper opening of the lower case body;
a pressure plate located on the lower-frame base plate in facing engagement therewith and configured to make contact with the screen area of the video monitor when the video monitor is positioned in the transport case;
an upper frame configured to securely attach to the lower frame and configured to extend transversely at least partially across the lower frame to hold the screen area in facing engagement with the pressure plate; and
a rollable platform configured to be removably securable to an exterior of the transport case, the rollable platform including:
a platform base with an upper platform surface and a lower platform surface;
a first wheel of fixed orientation extending below the lower platform surface; and
a second wheel of fixed orientation parallel to the first wheel, the second wheel extending below the lower platform surface;
wherein the transport case includes:
a first attachment fixture located on an exterior of the transport case, the first attachment fixture being configured for removably securing the rollable platform to the exterior of the transport case with the first wheel and the second wheel aligned parallel with respect to at least one of the first outer panel or the second outer panel; and
a second attachment fixture located on the exterior of the transport case, the second attachment fixture being configured for removably securing the rollable platform to the exterior of the transport case with the first wheel and the second wheel aligned perpendicularly with respect to at least one of the first outer panel or the second outer panel.

22. The transport case according to claim 21, further comprising:
a handle body comprising a handlebar and a handle base fixed to the handlebar, the handle base being selectably securable to the exterior of the transport case with the handlebar oriented perpendicularly with respect to at least one of the first outer panel or the second outer panel, and selectably securable with the handlebar oriented parallel with respect to at least one of the first outer panel or the second outer panel.

23. The transport case according to claim 21, further comprising:
a handle body comprising a handlebar and a handle base fixed to the handlebar, the handle base being selectably securable to the exterior of the transport case;
a third attachment fixture located on the exterior of the transport case, the third attachment fixture being configured for removably securing the handle base to the exterior of the transport case with the handlebar oriented perpendicularly with respect to at least one of the first outer panel or the second outer panel; and
a fourth attachment fixture located on the exterior of the transport case, the fourth attachment fixture being configured for removably securing the handle base to the exterior of the transport case with the handlebar oriented parallel with respect to at least one of the first outer panel or the second outer panel.

24. The transport case according to claim 23, wherein:
the exterior of the transport case defines a rectangular body having a top main surface, a bottom main surface, a first end surface, a second end surface, a first side surface, and a second side surface; and
the third attachment fixture and the fourth attachment fixture are both located on the second end surface.

25. The transport case according to claim 21, wherein:
the exterior of the transport case defines a rectangular body having a top main surface, a bottom main surface, a first end surface, a second end surface, a first side surface, and a second side surface; and
the first attachment fixture and the second attachment fixture are both located on the first end surface.

* * * * *